United States Patent [19]

Peterson

[11] Patent Number: 4,796,168
[45] Date of Patent: Jan. 3, 1989

[54] LIGHTING FIXTURE FOR FLUORESCENT LAMPS

[76] Inventor: Jann Peterson, Rytterbakken 34, DK-2670 Greve Strand, Denmark

[21] Appl. No.: 41,830

[22] Filed: Apr. 23, 1987

[30] Foreign Application Priority Data

May 1, 1986 [DK] Denmark .............................. 2015/86

[51] Int. Cl.⁴ .............................. F21S 3/02; F21V 7/12
[52] U.S. Cl. .................................. 362/217; 362/247; 362/297; 362/346
[58] Field of Search ............... 362/217, 241, 247, 297, 362/298, 341, 346, 347

[56] References Cited

U.S. PATENT DOCUMENTS

| | | | |
|---|---|---|---|
| 3,125,301 | 3/1964 | Stotter | 362/217 |
| 3,246,138 | 4/1966 | Florence | 362/217 |
| 4,006,355 | 2/1977 | Shenitz et al. | 362/217 |
| 4,242,725 | 12/1980 | Douma et al. | 362/217 X |
| 4,493,012 | 1/1985 | Petersen | 362/225 |
| 4,747,027 | 5/1988 | Rieger | 362/297 X |

*Primary Examiner*—Michael Koczo
*Assistant Examiner*—Richard R. Cole
*Attorney, Agent, or Firm*—Marmorek, Guttman & Rubenstein

[57] ABSTRACT

The lighting fixture is designed for a pair of two tubular fluorescent lamps and comprises side reflector plates being mutually connected by means of a number of equidistantly spaced transverse reflector plates. Each side reflector plate comprises an upper strongly curved portion passing into a lower less curved portion. The lighting fixture futhermore comprises top reflector plates above the fluorescent lamps and the invention is characterized in that these top reflector plates have the same cross sectional shape and dimensions as the mutually identical side reflector plates whereby they are mounted conversely of these i.e. that the less curved portion extends over and out from the corresponding fluorescent lamp while the strongly curved portion is situated between the two fluorescent lamps with its edge abutting the corresponding edge of the opposite top reflector plate, the abutting edges being abreast of the fluorescent lamps, preferably their axes. When using identical reflector plates not only a reduction of manufacturing costs is achieved, but also a substantial economy of transport costs for individual parts so that the assembly of the lighting fixture advantageously can be performed by dealers or electricians. Surprisingly, a better light efficiency and a uniform lighting degree of illuminated surface is achieved compared to known lighting fixtures of corresponding types, i.e. comprising both side and top reflector plates.

5 Claims, 1 Drawing Sheet

LIGHTING FIXTURE FOR FLUORESCENT LAMPS

FIELD OF THE INVENTION

This invention relates to a lighting fixture of the type provided with lamp sockets defining a pair of axes for a set of two fluorescent lamps, which axes together define a plane, a side reflector plate at each side of said pair of axes, which two side reflector plates are mutually interconnected by means of a number of mutually spaced transverse reflector plates, and whereby each said side reflector plate follows in its transverse direction an even curve having an upper relatively strongly curved portion passing into a lower, less curved portion, and the two top reflector plates extend over said axes towards the median plane between the two side reflector plates.

BACKGROUND OF THE INVENTION

Previously known such lighting fixtures comprise a single top reflector plate usually having the same curvature over its entire width and being placed in the space between the two side reflector plates. Such fixtures offer the advantage that they utilize a comparatively large proportion, up to 80%, of the total quantity of light radiated from the fluorescent lamps, and further they ensure a relatively even illumination of the surface situated under the fixture and illuminated thereby.

It should be noted that the terms of direction such as "upwards", "downwards", "perpendicularly" and "horizontally" are used here and in the following on the assumption that the fixture, as is normally the case, is mounted with the axes of the fluorescent lamps situated in the same horizontal plane and with the light emission opening pointing downwards, even though the fixture in special applications can be oriented differently so that by these applications said terms of direction do not agree with reality.

A further advantage of the known fixtures of said type is that as a result of the transverse reflector plates, whether smooth or more appropriately having an almost serrated cross-section, they do not seem glaring even when viewed obliquely in a direction directly towards the fluorescent lamps and even if the light emission opening is not covered by a light diffusion plate.

Less convenient it is, however that in the known fixtures of the type concerned, the parts of which are normally made from plastic and, for achieving the reflector effect, metallized either on the inner side (side and top reflector plates) or on both sides (transverse reflector plates), a number of differently shaped and dimensioned parts are used each requiring expensive manufacturing machines and moulds, and the assembling of which requires specially trained persons since the parts must match perfectly.

Hitherto, therefore, such fixtures have been manufactured centrally and then been distributed to middlemen who have e.g. mounted the sockets for the fluorescent lamps and distributed the fixtures to electricians. As a result of the small weight, but large volume of the fixtures, the transport costs have relatively been too heavy.

SUMMARY OF THE INVENTION

The object of this invention is to provide a fixture of the type concerned which provides at least the same utilization of light and evenness of illumination as the previously known such fixtures, but which renders possible the use of fewer different part and a simple assembly so that the different parts of the fixtures can be dispatched closely packed together, thus resulting in a substantial reduction of transport costs and a simple assembly at the middlemen who are offered the opportunity of adapting the length of the fixtures to the field of application so that no special orders to the factory will be necessary.

According to this invention this has been achieved by the presentation further appearing from claim 1.

It has proved that when the top reflector plates are shaped exactly as the side reflector plates, but are fitted conversely of these, i.e. so that the strongly curved portion of the plates instead of being situated close to a fitted fluorescent lamp is situated away therefrom, an efficiency of light is achieved which is even larger than hitherto it has been possible to achieve while maintaining an even distribution of light. At the same time, the said top reflector plates are fitted in a very simple way, wherefore the assembly can safely be left to the middlemen or electricians since the tool required for connecting the side reflector plates to the transverse reflector plates is simple and inexpensive. At the same time the side and top reflector plates—which are identical—can be manufactured not only in great lengths suitable for parcelling by the middlemen but also be packed very closely resulting in packing units having a high weight compared to the volume resulting in low transport costs. The operations requiring the greatest costs and utilization of specialists such as e.g. the extruding of reflector plates in large lengths and especially the metallization of these plates advantageously can be performed centrally.

Particularly advantageous is the embodiment of the present invention described in claim 2, preferably further as stated in claim 3. The mutual support between the edges of the top reflector plates is easily provided by a middleman or by an electrician, e.g. by gluing, or for ensuring a yielding support, by using adhesive tape. This support between said edges stabilizes the assembly of said two top reflector plates wherefore they are easy to handle and fit as besides the plates only have to rest on the upper edges of the side reflector plates.

Most advantageous is the embodiment of the present invention defined in claim 4 ensuring the most exact fitting of the top reflector plates and a solid support thereof, also at their edges.

A particular advantage of the new fixture is that in a simple way it renders possible the amendment of existing lighting fixtures adapted to four fluorescent lamps so that the same illumination effect may be achieved from such fixtures even if these are fitted only with two fluorescent lamps. According to this invention this may be achieved by the features appearing from claim 5.

DESCRIPTION OF THE PREFERRED EMBODIMENTS

Figure 1:
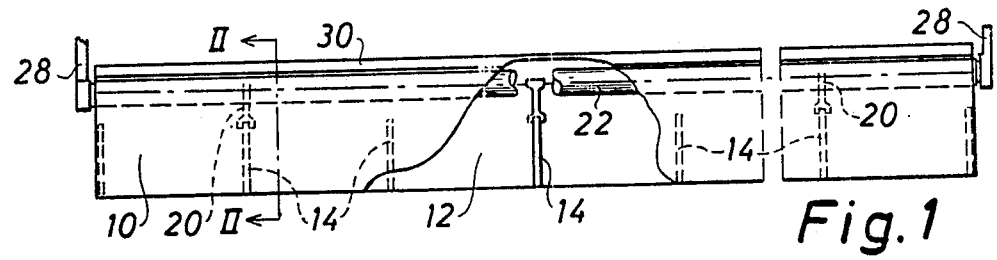
FIG. 1 is a partly sectional, elevational view of an embodiment of the fixture of this invention.
Figure 2:
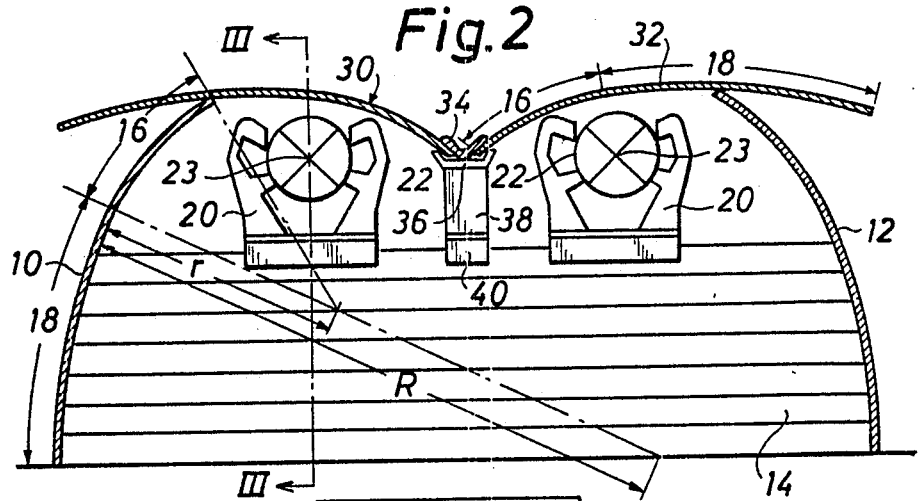
FIG. 2 is in a larger scale a cross-sectional view on line II—II through the fixture shown in FIG. 1.
Figure 3:
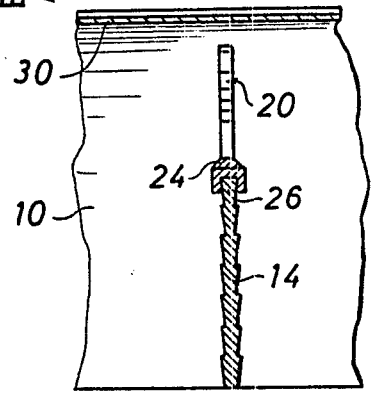
FIG. 3 is a cross-sectional view of a transverse reflector plate carrying a lamp support.

The fixture shown in FIGS. 1-3 comprises two side reflector plates 10 and 12 mutually interconnected by means of transverse reflector plates 14 mutually spaced along the length of the fixture e.g. having a mutual distance in the range of the height of the side reflector plates 10 and 12.

As appears on the left of FIG. 2, the cross section of each side reflector plate 10 and 12 describes an even curve comprising an upper portion 16 and a lower portion 18, the upper portion 16 being considerably more strongly curved than the lower portion 18. In the embodiment shown, the upper curved portion 16 describes a circular arc having a radius "r" and extending over an angle of about 35° whereas the lower curved portion 18 has a radius "R" that is 2½ times larger than "r" and extends over an angle of about 25°. In an existing prototype of the fixture, is r=80 mm and R=200 mm.

The side reflector plates 10 and 12 are made from plastic by extrusion and are metallized on the inner side, e.g. by evaporation metallizing under vacuum, so that the inner sides are highly light reflecting.

The transverse reflector plates 14 are also made of plastic, but pressure diecast and are metallized on both sides. These plates 14 have, as appears of FIG. 3, a serrated cross-section, known per se, and their outer edges comprise small pins, not shown, which during assembly of the fixture are led through corresponding, punched small holes in the side reflector plates 10 and 12 and then somewhat compressed from the outside to provide a kind of riveted joint between each plate 14 and the side plates 10 and 12.

On two mutually spaced transverse plates 14, usually the two next-to-the-outermost transverse plates, two lamp grippers 20 are arranged adapted in a known manner to grasp a tubular lamp and thereby to attach the fixture to two parallel tubular fluorescent lamps 22. Each gripper 20 is provided with a dovetail base 24, FIG. 3, which takes a firm hold of the upper wedge-shaped part of the serrated portion 26 of the transverse plate 14.

The ends of the fluorescent lamps 22 whose axes 23 are defined by the grippers 20 are usually inserted in sockets on brackets 28, FIG. 1 extending downwards from a not shown ballast housing fixed to or hanging down from a ceiling.

In order to achive the best utilization of the light from the fluorescent lamps 22, the fixture comprises top reflector plates 30 and 32 shaped in exactly the same way as the side reflector plates 10 and 12 but being fitted conversely of the latter so that their strongly curved portions 16 extend downwards and the less curved portions extend upwards, as clearly appears from FIG. 2.

The two top reflector plates 30 and 32 abut each other at the free edges of the strongly curved portions 16, advantageously being interconnected e.g. by means of an adhesive foil 34 or by gluing, thereby using an adhesive which is yielding also after solidifying.

Opposite at least two, preferably three, of the transverse reflector plates 14, are the top reflector plates 30 and 32 with their mutually connected edges resting in groove-shaped heads 36 on supports 38 comprising at the bottom a dovetailed base 40 thereby crasping and thereby being attached to the upper serrated portion 26 of the transverse plate 14 in question in the same manner as above explained in connection with the grippers 20. Owing to the groove-shaped form of their heads 36 these supports 38 prevent an unintentional displacement in sidewards direction of the top reflector plates 30, 32.

The supports 38 have such a height that the abutting edges of the top reflector plates are supported in the plane defined by the axes 23 of the fluorescent lamps 22, however, depending on the dimensions of the fixture and the distance between the fluorescent lamps, the height of the supports may vary but the abutting edges should be supported on level with the fluorescent lamps ie. inside an area extending ½d on each side of the said plane, wherein "d" is the diameter of the fluorescent lamps for which the fixture is intended.

Measurings made with fixtures of the described kind have shown that such fixtures not only provide an efficiency of illumination exceeding what so far has been possible to achieve with fixtures comprising two parallel fluorescent lamps but also an almost completely uniform degree of illumination of the total surface under the fixture which is illuminated within a perpendicular distance from the fixture of up to 3 m.

Figure 4:
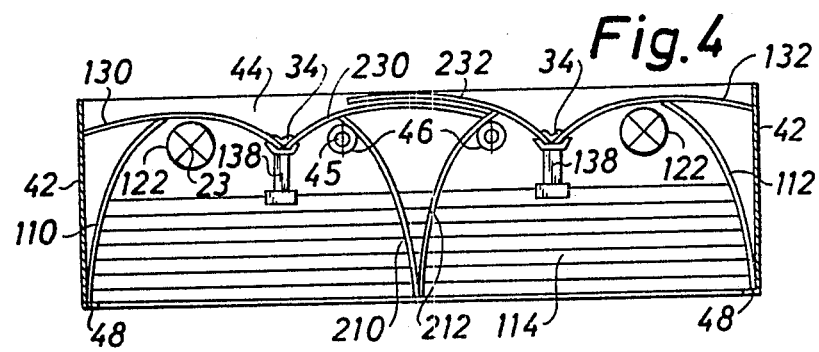
FIG. 4 is a cross-sectional view of another embodiment of the fixture resulting from an amendment of an existing fixture.

FIG. 4 shows how it is possible to modify commenly used four-lamp-lighting fixtures in a simple way so that they become fixtures of the type herein described resulting by use of only two fluorescent lamps in an even better and more intense illumination than it so far has been possible to achieve with such fixtures despite the use of four fluorescent lamps.

Such fixtures normally comprise a rectangular frame with length walls 42 and end or transverse walls 44, the latter often supporting the sockets 46 necessary for four fluorescent lamps. Each length wall 42 comprises at the bottom a transverse flange 48 which besides stiffening the frame also carries a light diffusion plate that may be a solid, transparent plate or a lattice.

If such a fixture is to be used as a fixture of this invention, the two intermediate fluorescent lamps are removed so that their sockets 46 only define the lamp axes 45 as only the outermost fluorescent lamps 122 are to be used. Outside these fluorescent lamps 122 or rather outside their axes 23, side reflector plates, 110 and 112 respectively, corresponding to the above side reflector plates 10 and 12 are provided and are mutually connected by means of transverse reflector plates 114 corresponding to the transverse reflector plates 14 described above in connection with FIGS. 1-3, but being substantially longer than these. Each transverse reflector plate 114 may comprise two mutually slidable, but in relation to each other securable parts so that they can be adapted to existing four-lamp-lighting fixtures of different widths.

On the inner side of the axes 23 of each of the two outermost fluorescent lamps 22, a top reflector plate, 130 and 132 respectively, having the same cross-sectional shape and dimensions as the side reflector plates 110 and 112 is fitted, as these top plates 130 and 132 are arranged according to the same principles as described above in connection with FIG. 2, but each of these top plate rests with its weakly curved portion on the upper edge of the corresponding side reflector plate, while the free end of the strongly curved portion rests on supports 138 on the upper edge of the transverse reflector plates 114.

Two additional intermediate side reflector plates 210 and 212 curving away from each other are arranged close to the perpendicular median line of the transverse reflector plates 114 on each side of this median line and between the lamp axes 45 not intended to be equipped with lamps. Said reflector plates have the same cross-sectional shape and dimensions as the proper side reflector plates 110, 112 and are provided opposite of the transverse reflector plates 114 with slots so that they can grip the transverse reflector plates. Even though not strictly necessary it is advantageous that these slots have substantially the same cross-sectional shape as the transverse reflector plates 114, cf. FIG. 3. Each said intermediate side reflector plate 210 and 212 cooperate with a top reflector plate, 230 and 232, respectively, also having the same cross-sectional shape as the side reflector plates and resting with the edge of its strongly curved portion on the adjoining support 138 close to the opposite top reflector plate, 130 and 132, respectively. Last said edges being preferably interconnected as described above in connection with FIG. 2.

It should be noted that the first time a four-lamp-fixture of a certain type and having certain dimensions is to be modified by inserting reflector plates of said kind it may be necessary to adjust the position of the intermediate side reflector plates 210, 212 on the transverse reflector plates 114 in order to obtain the same or even a better light emitting effect by the two maintained fluorescent lamps than by the original four fluorescent lamps. Such adjustment may be necessary in the longitudinal direction of the said plates as well as to the inclination during testing by use of light measuring equipment, but a position of the plates once found can be repeated with other fixtures of corresponding size and configuration. It has proved, however that by using a fixture of the described type, i.e. with identical side and top reflector plates it is possible to obtain a lighting effect which despite the use of only two fluorescent lamps is at least just as good as obtainable by the original fixture comprising four fluorescent lamps, in spite of only half the amount of electricity is used. Furthermore such a modified fixture ensures a far better degree of illumination of the total illuminated surface than is obtainable by the original fixtures. Furthermore the amendment is effected by use of two types of elements, transverse reflector plates and curved reflector plates applicable both as side and as top reflector plates, and a simple punching device only. The costs of the amendment are therefore so small that they are quickly paid for due to the halved energy consumption.

The side and top reflector plates are above described having a specified cross-sectional form composed of two circular arcs, but many other cross-sectional forms ensuring a strongly curved portion passing without edges into a less curved portion are applicable with a good result.

What is claimed:

1. A lighting fixture for tubular fluorescent lamps, comprising lamp sockets (20) defining a pair of axes (23) for a set of two fluorescent lamps (22) said axes together defining a plane, a side reflector plate (10, 12) at each side of said pair of axes, said two side reflector plates being mutually connected by means of a number of mutually spaced transverse reflector plates (14), each said reflector plate (10, 12) following in its transverse direction an even curve having an upper relatively strongly curved portion (16) passing into a lower, less curved portion (18), two top reflector plates (30, 32) extending over said axes (23) towards the median plane between said two side reflector plates (10, 12), said two top reflector plates (30, 32) being arranged symmetrically relative to said median plane and having the same cross sectional shape and dimensions as the said two mutually identical side reflector plates (10, 12), whereby the less curved portion (18) of each said top reflector plate (30, 32) is situated above the corresponding one of said axes (23), and the strongly curved portion (16) thereof being situated between the said axes (23) with its lowest end arranged inside an area extending $\frac{1}{2}$d on each side of the said plane defined by the two axes (23), wherein "d" is the diameter of the fluorescent lamps (22) for which the fixture is intended.

2. A lighting fixture as claimed in claim 1, wherein said two top reflector plates (30, 32) being mutually interconnected (34) at their downwards facing edges.

3. A lighting fixture as claimed in claim 1, wherein said two top reflector plates (30, 32) being yieldingly interconnected.

4. A lighting fixture as claimed in claim 1, wherein supports (36) are arranged on the upper edges of at least two of said transverse reflector plates (14) and being adapted to support the said abutting edges of said two top reflector plates (30, 32).

5. A lighting fixture as claimed in claim 1 and being provided with four of said axes (23, 45) of which only two (23), however, are intended for being equipped with fluorescent lamps, and with four of said side reflector plates (110, 112, 210, 212), of which two outer reflector plates (110, 112) are mounted outside each outer one of said axes (23) and are firmly connected to said transverse reflector plates (114), while the other two side reflector plates (210, 212) are placed intermediately between the two of said axes (45) not intended to be equipped with lamps, and are provided with slots by means of which they are pushed over said transverse reflector plates (114), and wherein two top outer reflector plates (130, 132) are abutting two top inner reflector plates (230, 232) at the free edges at their said strongly curved portions being arranged between each outer one of said side reflector plates (110, 112) and the closest one of said intermediate side reflector plates (210, 212).

* * * * *

UNITED STATES PATENT AND TRADEMARK OFFICE
CERTIFICATE OF CORRECTION

PATENT NO. : 4,796,168

DATED : January 3, 1989

INVENTOR(S) : JANN PETERSEN

It is certified that error appears in the above-identified patent and that said Letters Patent is hereby corrected as shown below:

On the title page Item [76], the inventor's name should read: -- Jann Petersen --.

Item [19], "Peterson" should read -- Petersen --.

Signed and Sealed this

First Day of August, 1989

Attest:

DONALD J. QUIGG

Attesting Officer

Commissioner of Patents and Trademarks